United States Patent [19]

Dobler et al.

[11] Patent Number: 5,051,694
[45] Date of Patent: Sep. 24, 1991

[54] DEVICE HAVING OPPOSITELY SPACED COILS FOR DETERMINING A SHAPE OF SCREW PARTS

[75] Inventors: Klaus Dobler, Gerlingen; Hansjoerg Hachtel, Weissach, both of Fed. Rep. of Germany

[73] Assignee: Robert Bosch GmbH, Stuttgart, Fed. Rep. of Germany

[21] Appl. No.: 463,154

[22] Filed: Jan. 10, 1990

[30] Foreign Application Priority Data

Feb. 24, 1989 [DE] Fed. Rep. of Germany ....... 3905744

[51] Int. Cl.$^5$ ..................... G01R 33/12; G01N 27/82; G01B 7/28; B07C 5/00
[52] U.S. Cl. ................................ 324/232; 209/546; 324/226; 324/227; 324/234; 324/238
[58] Field of Search .......................... 324/227, 229–232, 324/234, 236–243; 209/546, 549, 562, 567

[56] References Cited

U.S. PATENT DOCUMENTS

| 2,537,731 | 1/1951 | Angell | 324/229 |
| 3,392,829 | 7/1968 | Keinanen | 324/243 X |
| 3,539,006 | 11/1970 | Hanna et al. | 324/238 X |
| 3,870,948 | 3/1975 | Holt et al. | 324/236 |
| 3,883,796 | 5/1975 | Holt et al. | 324/236 |

FOREIGN PATENT DOCUMENTS 1113647  5/1989  Japan ................................ 324/237

Primary Examiner—Gerard R. Strecker
Attorney, Agent, or Firm—Michael J. Striker

[57] ABSTRACT

A measuring device for contactless determination of condition of screw shaped structural elements comprises two oppositely located coils supplied with an alternating current spaced from one another so that an electrically conductive structural element passes therebetween, and transporting elements formed so that the structural element is guided on an edge so that a distance between the structural element and at least one of the coils remains constant during a measuring process.

6 Claims, 3 Drawing Sheets

DEVICE HAVING OPPOSITELY SPACED COILS FOR DETERMINING A SHAPE OF SCREW PARTS

BACKGROUND OF THE INVENTION

Related Applications

The present application relates to subject matter similar to that disclosed in U.S. patent application Ser. No. 462,798, filed Jan. 10, 1990 by the applicants herein.

The present invention relates to a measuring device for contactless control of a design of metallic screw-shaped structural elements.

Measuring devices of the above mentioned general type are known in the art. In the known measuring device the design of screws is determined with the use of coils through which high frequency alternating current flows. The measuring principle deals with the change of the impedance of the coils, when the shape of the structural element varies. The coils cover integrally, over the whole length or over a partial region, the distance between the coils and the structural element. Thus, there is a possibility that the different screw errors cause an opposition action during generation of the eddy current. Thereby, both measuring signals are compensated, and the measuring device releases a measuring signal for a proper screw, despite the defective shape of the screw. This would be the case when the screw to be measured has too great a thread diameter and too short a thread length, or when the thread has too narrow a pitch and simultaneously has too small an outer thread diameter.

SUMMARY OF THE INVENTION

Accordingly, it is an object of the present invention to provide a measuring device of the above mentioned general type, which avoids the disadvantages of the prior art.

More particularly, it is an object of the present invention to provide a measuring device which has the advantages in that it can control the design of the structural elements such as for example screws, in an error-free manner.

In particular, the number of the defective measurements resulting from simultaneously occurring measuring errors compensating in their action, is significantly reduced. The accuracy of the measurements and its contents is thereby significantly improved.

In keeping with these objects and with others which will become apparent hereinafter, one feature of the present invention resides, briefly stated, in a measuring device in which the structural element moves on an edge, so that a distance between the structural element and at least one of the two coils remains constant during the measuring process. This is achieved by a transporting means, in which the above mentioned edge forms a part.

The coils can have any shape in the inventive measuring device. It is possible to use a cylindrical coil, and the screw passes this coil. Also, the precision of the coil windings can satisfy lower requirements.

In an especially simple manner conventional reactive (resistance) coils can be used, for reliably performing the thread contour measurement.

In accordance with another feature of the present invention, the edge has at least one window, and the first coil is arranged in the region of the window.

Still another feature of the present invention is that the coils can be arranged diametrically opposite to one another.

Finally, in accordance with a further feature of the present invention, the coils can be electrically combined in an AND circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
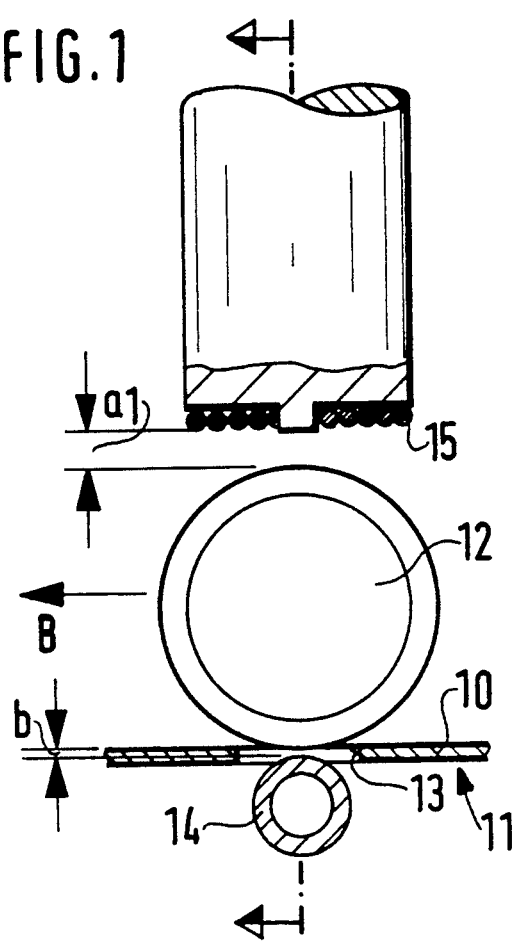
FIGS. 1–4 are views showing a side view of a guiding rail of a conveyor, with different screw designs to be measured in a measuring device in accordance with the present invention.

FIG. 1 shows a guiding rail 10 of a conveyor 11, and a screw 12 to be controlled which slides along the guiding rail. The screw is composed of a ferromagnetic or non-ferromagnetic material, but in any event of an electrically conductive material. The guiding rail 10 can be composed of any material. When it is composed of a metallic material, it is advantageous to provide a window 13.

A coil 14 is arranged in the region of the window 13 and tests the thread of the screw 12. A second coil 15 is provided on the opposite side and determines the diameter of the screw 12. For the measuring process it is not absolutely necessary to arrange both coils at diametrically opposite locations one against the other. What is important is that the distance b between the screw 12 and the coil 14 is always the same. For this purpose the guiding rail 10 of the conveyor 11 can be for example inclined at a predetermined angle $\alpha$, so that the screw 12, depending upon the force of gravity, can slide or roll on the guiding rail.

The coil 14 is formed in the drawings as a cylindrically wound coil, and the coil 15 is formed as a circular, oval or rectangular wound flat coil. The axis of symmetry of the cylindrical coil 14 extends parallel to the axes of symmetry of the screws 12 to be measured. No special shape for the coil 14 or 15 is required for the measuring principle. Further, the coils 14 and 15 for monitoring the screws 12 can act separately from one another in time. For a rational design of a measuring device, both coils 14 and 15 must be arranged diametrically opposite to one another.

When the operation of the conveyor 11 starts the screws 12 move one after the other in the direction B between the coils 14 and 15. If the coils 14 and 15 are supplied with a high frequency alternating current, then a magnetic alternating field is produced at the coils 14 and 15. It causes eddy currents on the metallic surface of the threaded shafts of the screws 12. For simplification, only the measurement of the screws which are composed of electrically conductive and non-ferromagnetic material will be described, so that the eddy current effect is used. The greater is the surface through which the magnetic field passes, the more eddy current is produced. Further, the magnitude of the produced eddy current depends on the shape of the thread as well as on the distance of the coils 14 and 15 from the outer surface of the shaft. Therefore, for an accurate error determination it is necessary that the distance b between the coil 14 and the threaded shaft during their measurement remain the same. By the produced eddy current, the coil alternating current resistance is reduced, and this leads to a reduction of voltage at the coils 14 and 15.

Figure 2:
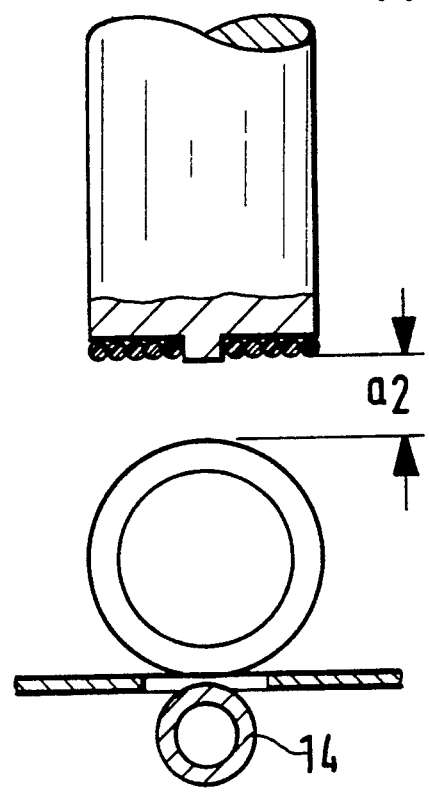
Figure 5:
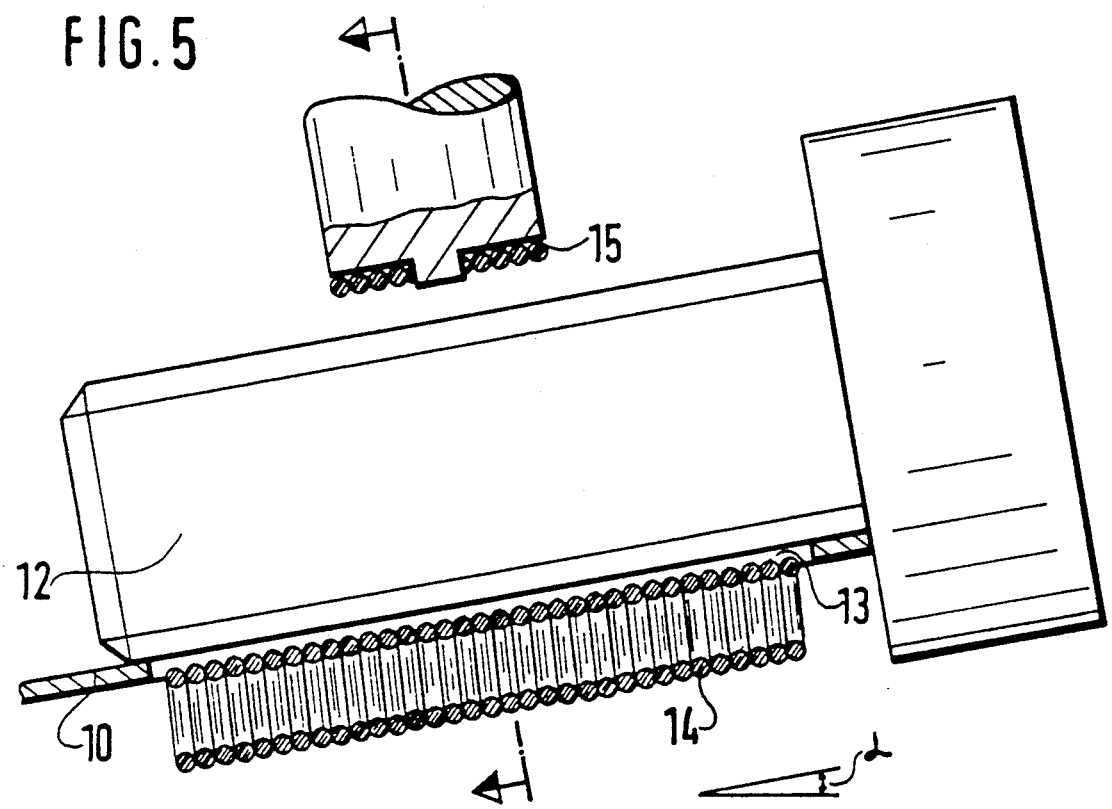
FIG. 5 is a view showing a diagram of the operation of the device of FIG. 1.
Figure 6:
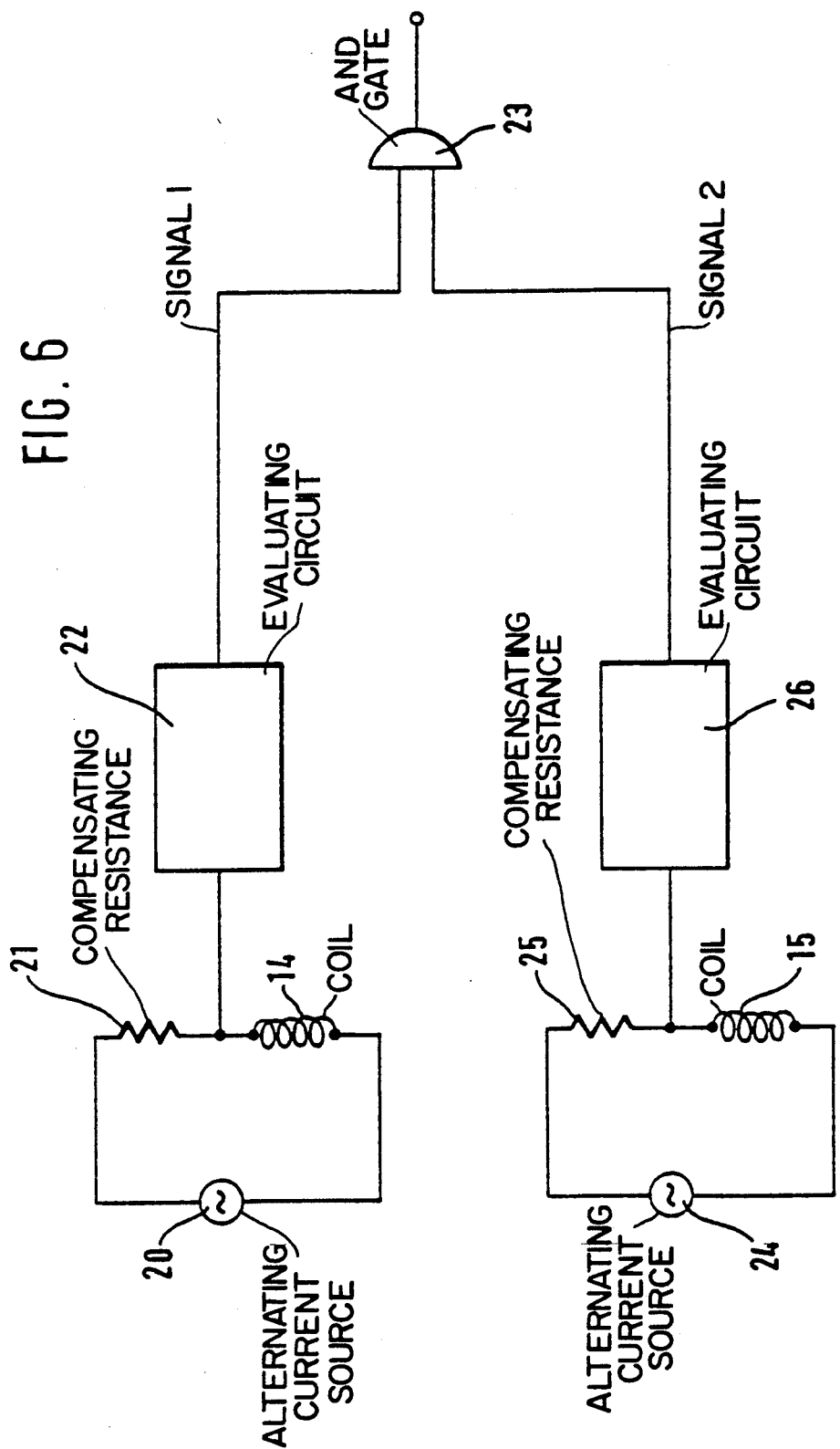
FIG. 6 shows arrangement of coils of the device according to the invention in an AND circuit.

The coil 14 serves for testing the thread of the screw 12. Since the distance to the screw is always constant, changes in the alternating current resistance are connected substantially only with a deviation of the shape of the thread. If the screw 12 has for example a different pitch than the calibrated screw, or the thread is damaged at one or several places, the changes in the alternating current resistance will occur. The measuring signal will deviate from the predetermined nominal value. The other coil 15 serves, preferably, for determination of the diameter of the screw 12. Depending on the distance $a_1$ between the coil 15 and the screw 12, a predetermined measuring signal is produced. This measuring signal is however dependent on the thread shape, or in other words on the pitch and depth of the thread, since the eddy current is formed on the whole surface of the thread. Due to the fixed distance to the wall 10, it is often possible to associate a respective size value to a respective measuring signal, as will be explained in the examples hereinbelow:

If the distance $a_1$ is increased as shown in FIG. 2 by the distance $a_2$, this leads to a reduction of the eddy current produced in the outer surface of the screw 12 and thereby to an increase in the resistance value of the coil 15. Since in FIGS. 1 and 2 the thread shape is formed similarly, the coil 14 will receive each time approximately the same measuring signal. The coil 15, to the contary, produces different measuring signals as shown in FIGS. 1 and 2. Thereby it is possible to exactly recognize the error of the screw 12 and associate to an error class. If the coil 14 in the preferable embodiment is cylindrical, the eddy current is formed only in the outer surface regions of the shaft of the screw 12, located in the vicinity of the coil 15. Since the coil 14 in its cylindrical embodiment approximately extends over the whole shaft length as can be seen in FIG. 5, the whole length of the thread is measured. The measuring signals of both coils 14 and 15 are digitally evaluated in a an evaluating circuit and combined with one another by an electrical AND circuit as shown in FIG. 6.

The coil 14 is supplied with current from an alternating current source 20 through a compensating resistance 21. The measuring signal measured by the coil is picked up between the compensating resistance 21 and the coil 14 and converted with an evaluating circuit 22 into a digital signal 1. The coil 15 is supplied with current from a second alternating current source 24 through a compensating resistance 25. The measuring signal determined by the coil 15 is converted into a digital measuring signal 2 with the aid of a second evaluating circuit 26. Both measuring signals 1 and 2 are supplied to an AND-gate 23. At the output of the AND-gate 23 a signal representing screw condition is produced. This means that when the measuring signal 1 of the coil 14 represents an error-free measuring and the measuring signal 2 of the coil 15 also represents an error-free measuring signal for the directly measured screw, the value for an error-free screw is obtained as will be explained hereinbelow.

Figure 3:
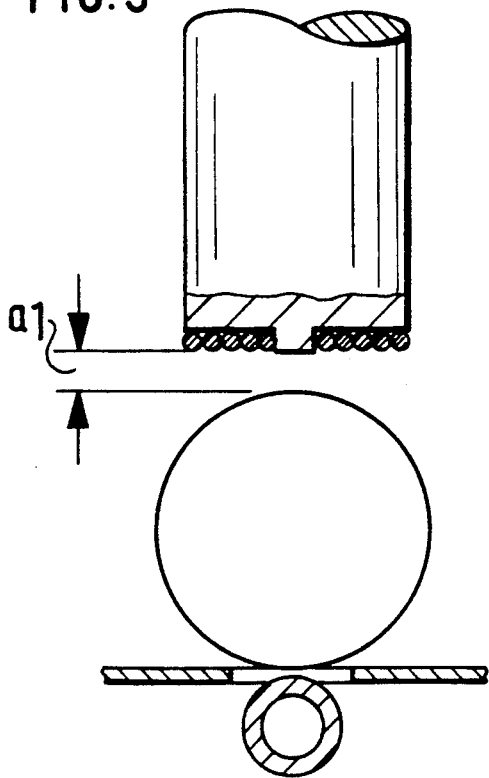
Figure 4:
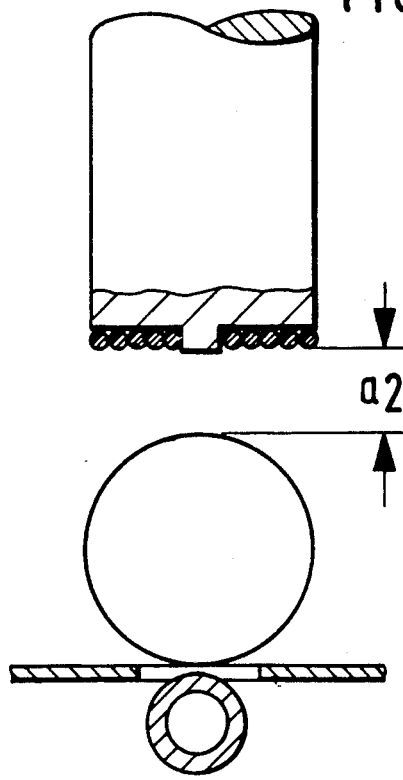

FIGS. 3 and 4 show the measuring principle, when, however, the diameter of the screw 12 is right or in other words the distance $a_1$ is the same, but there is no thread. In this case, the coils 14 and 15 measure an error signal. Despite the fact that in FIG. 3 the distances $a_1$ and b are equal to FIG. 1, the failing thread forms more eddy current. In FIG. 4, a screw without thread and with a diameter corresponding to FIG. 2 is shown, or in other words, distance $a_2$ to the coil 15. The coil 14 supplies an error signal corresponding to the embodiment of FIG. 3. The coil 15 can supply a measuring signal corresponding to FIG. 1, since the eddy current producing effect of the distance change and the surface change can be compensated relative to one another. Since however one of both measuring signals of the coils 14 and 15 deviates from the nominal value, the screw 12 can be recognized as defective and sorted out.

The same advantages can be provided by this measuring device when the screws are composed completely or partially of a ferromagnetic material. Instead of the eddy current effect, the ferromagnetic effect is here utilized. In other words, the influence of the electromagnetic alternating field of the coil due to the ferromagnetic properties of the material of the screw is used.

It will be understood that each of the elements described above, or two or more together, may also find a useful application in other types of constructions differing from the types described above.

While the invention has been illustrated and described as embodied in a measuring device for contactless control of design of screw shaped structural elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for determining a shape of screw parts, comprising a first coil supplied with alternating current for determining substantially a thread profile of screw parts and for generating a first signal representative of the thread profile of a screw part; a second coil spaced from said first coil and located opposite to said first coil, said second coil being supplied with alternating current for determining substantially a diameter of the screw part and for generating a second signal representative of the diameter of the screw part; and guide means extending between said first and second coils transversely thereto for guiding screw parts past said coils, said guide means and said first coil being arranged such that when screw parts of different diameters are moved along said guide means past said coils, said first coil is spaced the same constant distance from the screw part irrespective of the diameters thereof, the screw part being considered defective if at least one of the first and second signals deviates from a predetermined nominal value thereof by a predetermined amount.

2. A device as defined in claim 1, wherein said guide means comprises a guide rail.

3. A device as defined in claim 2, wherein said guide rail has at least a window, said first coil being located in the region of said window.

4. A measuring device as defined in claim 1, wherein said first coil is formed as a cylindrical coil.

5. A device as defined in claim 1, wherein said coils are located diametrically opposite relative to one another.

6. A device as defined in claim 1, wherein the signals from said coils are combined in an electronic AND circuit.

* * * * *